United States Patent [19]
Hyziak et al.

[11] Patent Number: 6,125,279
[45] Date of Patent: Sep. 26, 2000

[54] METHOD AND APPARATUS FOR EXTENDING COVERAGE IN A CELLULAR COMMUNICATION SYSTEM

[75] Inventors: Janusz Ryszard Hyziak, Des Plaines; Valentin Oprescu-Surcobe, Northbrook; Prakash Panjwani, Palatine, all of Ill.

[73] Assignee: Motorola, Inc., Schaumburg, Ill.

[21] Appl. No.: 09/003,608

[22] Filed: Jan. 7, 1998

[51] Int. Cl.[7] .............. H04Q 7/32; H04Q 7/30; H04Q 7/38
[52] U.S. Cl. .......... 455/445; 455/466; 455/44.1; 455/456; 455/561; 455/525; 455/31.2; 455/517
[58] Field of Search ................ 455/466, 31.2, 455/31.3, 445, 11.1, 12.1, 13.1, 456, 550, 525, 500, 561

[56] References Cited

U.S. PATENT DOCUMENTS

| | | | |
|---|---|---|---|
| 5,559,520 | 9/1996 | Barzegar et al. | 455/466 |
| 5,633,888 | 5/1997 | Stewart | 455/466 |
| 5,659,596 | 8/1997 | Dunn | 455/456 |
| 5,850,593 | 12/1998 | Uratani | 455/11.1 |
| 5,890,054 | 3/1999 | Logsdon et al. | 455/11.1 |
| 5,907,794 | 5/1999 | Lehmusto et al. | 455/11.1 |
| 5,915,208 | 6/1999 | Collyer | 455/11.1 |

*Primary Examiner*—Fan Tsang
*Assistant Examiner*—Keith Ferguson
*Attorney, Agent, or Firm*—Kenneth A. Haas

[57] ABSTRACT

Method for transmitting data packets between base site and designated mobile unit outside coverage area of base site comprises: identifying data packet; transmitting data packet to unit along calculated traffic path; determining if unit is designated unit; and retransmitting data packet from that unit until receiving unit is designated unit.

9 Claims, 6 Drawing Sheets

METHOD AND APPARATUS FOR EXTENDING COVERAGE IN A CELLULAR COMMUNICATION SYSTEM

FIELD OF THE INVENTION

The present invention relates generally to cellular communication systems and, in particular, to a method and apparatus for extending coverage in a cellular communication system for transmission of data packets between a gateway base site having a base station and a remote unit which travels beyond the range of the gateway base site along a traffic route or path.

BACKGROUND OF THE INVENTION

Communication systems are known to comprise a plurality of base sites that provide communication services to remote units located in corresponding service coverage areas of the base sites. During typical operation, the remote unit moves throughout the coverage area of the serving base site and the serving base site monitors a signal quality metric (e.g., received signal strength indication (RSSI)) of the remote unit's uplink communication signal. To account for changes in RSSI as the remote unit moves, the serving base site will issue commands directing the remote unit to increase or decrease the remote unit's transmit power as the need arises.

Typically, as the remote unit moves to the periphery of the serving base site coverage area, the transmit power of the remote unit as well as the transmit power of the base site must be increased to account for an increase in path losses between the serving base site and the remote unit. In certain situations (e.g., over large bodies of water, or at the frontiers of newly established cellular telephone systems) as the remote unit moves out of the base station's coverage area, there will be insufficient base station power for sustained communication with the remote unit. Additionally, no corresponding base station will be available for handoff purposes. During such instances, the remote unit will be unable to communicate with the communication system. Therefore, a need exists for a method and apparatus for extending coverage in a cellular communication system.

DETAILED DESCRIPTION OF THE PREFERRED EMBODIMENT

According to the teachings of the present invention there is provided a method for extending coverage in a cellular communication system for transmission of data packets between a base site and a remote mobile unit comprising the steps of providing each data packet with a mobile unit identification; transmitting a data packet to a first mobile unit along a traffic path to a designated remote mobile unit; determining if the receiving mobile unit is the designated mobile unit; and, if not, retransmitting from the mobile unit first addressed, the data packet along the traffic path to the designated remote mobile until the receiving mobile unit is the designated remote mobile unit, irrespective of the range of the base station.

Also according to the present invention there is provided a base site for transmitting data packets in a cellular communication system including: a microcomputer; a receiver coupled to the microcomputer for receiving mobile unit position data from a global positing satellite; a transmitter and a receiver coupled to the microcomputer for communicating with mobile units within the coverage area of the base site; protocol associated with the microcomputer for establishing a traffic route and a general direction of movement of a particular mobile unit; the receiver receiving data packets; and circuitry for causing the transmitter to transmit data packets addressed to the particular mobile unit to mobile units along the traffic route of the particular mobile unit.

Further according to the present invention there is provided a mobile unit for receiving and retransmitting data packets, the mobile unit comprising a microcomputer, circuitry coupled to the microcomputer for identifying from the data packet the address of a designated mobile unit, circuitry coupled to microcomputer for determining from the data packet the last known location of the designated mobile unit and circuitry for determining the most logical path or route of the designated mobile unit whereby the microcomputer can retransmit the data packet in a direction along the most logical path or route of the designated mobile unit. The mobile unit can be combined with and coupled to a personal computer for displaying, processing or storing e-mail, fax, video data or other data or for creating and transmitting such data in a data packet.

Still further according to the present invention there is provided a data packet having data, identification of a designated destination mobile station and, information on the last known location of the destination mobile station and information on the location of the base station or mobile station which last transmitted the date packet.

Figure 1:
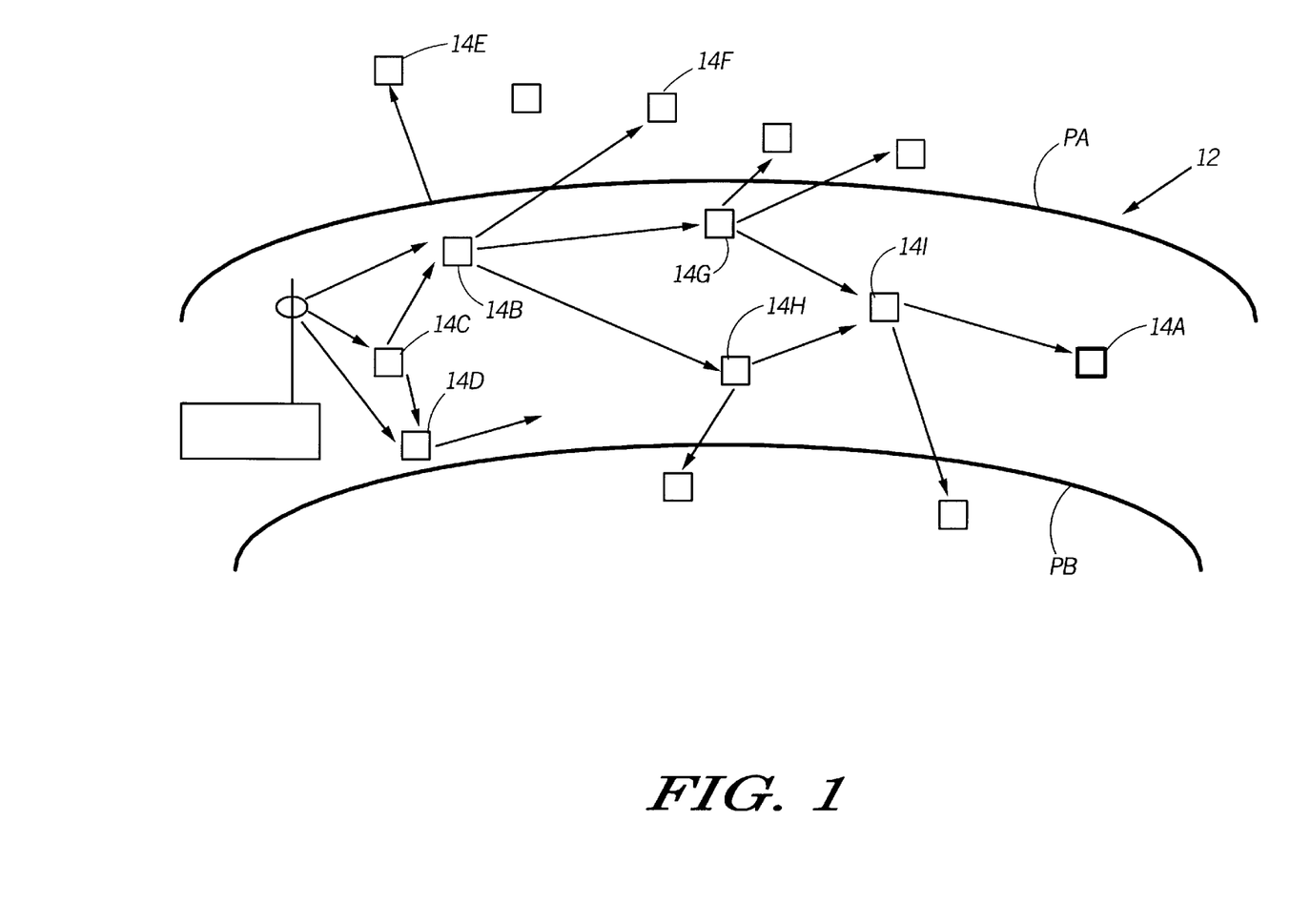
FIG. 1 is a schematic illustration of geographic routing of data packets along a traffic path.

The present invention assumes the presence of wireline-to-wireless base station 10 at gateway base sites located at entry and exit points along a traffic route or path 12 as shown in FIG. 1.

A traffic route 12 is a well defined area surrounding an interstate highway or a street where the density of mobile stations, i.e. mobile cellular telephones, 14 is high enough to allow communication among themselves. However, it is not necessary that the full traffic route 12 be covered by the base station 10 of the present invention.

Alternatively, the base station 10 can be fully deployed, but the operator might have it dedicated to voice channels, thus limiting its capacity and/or usability for data transmitting services.

It is also assumed that the base station 10 at the gateway base site is aware of its geographic coordinates such as by means of a GPS system. See U.S. Pat. No. 5,559,520 directed to wireless information system for acquiring location related information, the disclosure of which is incorporated herein by reference.

A further assumption is that a fairly large number of participants to the traffic on the route (vehicles or persons carrying PCS mobile units or station 14), will have two-way wireless communication equipment (a mobile station 14 in the form of a cellular telephone), on them and they can determine their geographical position (based on GPS or other location services).

It is reasonable to assume that those mobile stations 14 will not be in use 100% of the time, or, in other words, that there will be some excess capacity.

As a mobile station 14A enters the traffic route 12, the gateway base station 10 associated with the entry point becomes aware of its presence. Consequently, a home location register (not shown), becomes aware of the position of the mobile station 14A in terms of the last gateway base station 10. Until the mobile station 14A registers at another gateway base station 10, the messages and data packets addressed to the mobile station 14B will be routed by the circuitry in the first gateway base station 10.

The system of the present invention enables the first base station 10 to deliver messages or data packets to the designated mobile 14A when the mobile station 14A is no longer in the coverage area of the first gateway base station 10, but it has not entered yet the coverage area of the next gateway/base station 10; in other words, while the mobile station 14A is in the traffic route 12.

The traffic route 12 is determined by the set of its geographical coordinates. The circuitry of the base station 10 is aware of which coordinates are inside the traffic route and which ones are outside. In addition, proximity relationships within the traffic route 12, based on geographical coordinates can be inferred, making possible, further the determination of the direction of movement of the mobile station 14A. This information is passed on to the mobile stations 14 along the route 12 as they enter the traffic route 12 such that they also become aware of the topology of the traffic route 12.

Figure 2:
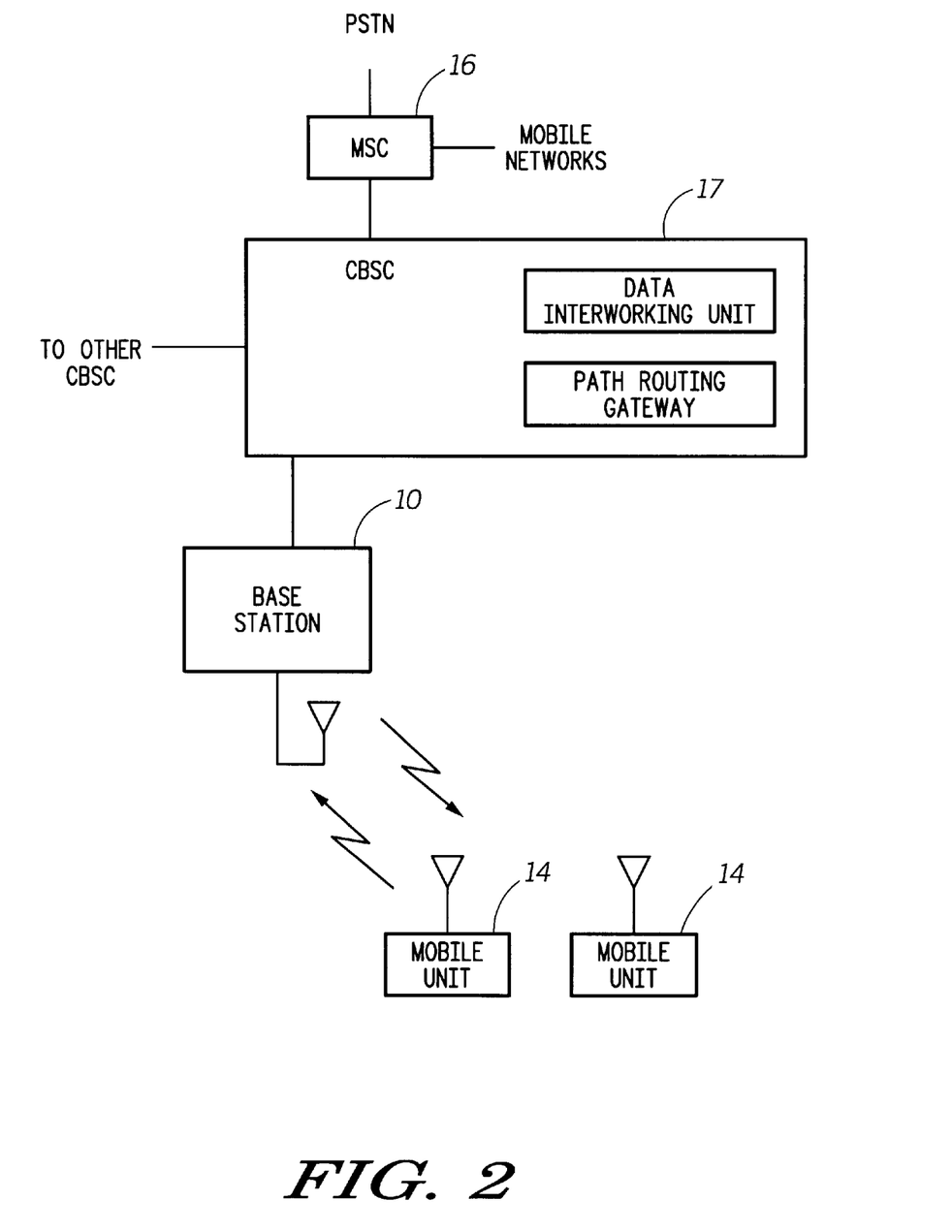
FIG. 2 is a block schematic diagram of a base station and mobile unit.

FIG. 2 is a block diagram of a base station 10 and mobile units 14. As shown, a public switch telephone network (PSTN), is connected to a mobile switching center (MSC) 16, which also communicates with other mobile networks. The mobile switching center 16, in turn, is connected to a central base station controller (CBSC) 17 which includes a data interworking unit and a path routing gateway.

An output from the CBSC 17 is supplied to a base station 10 which includes a transmitter and antenna and hardware and software for timing of the signal and for spreading out the signal.

Figure 3:
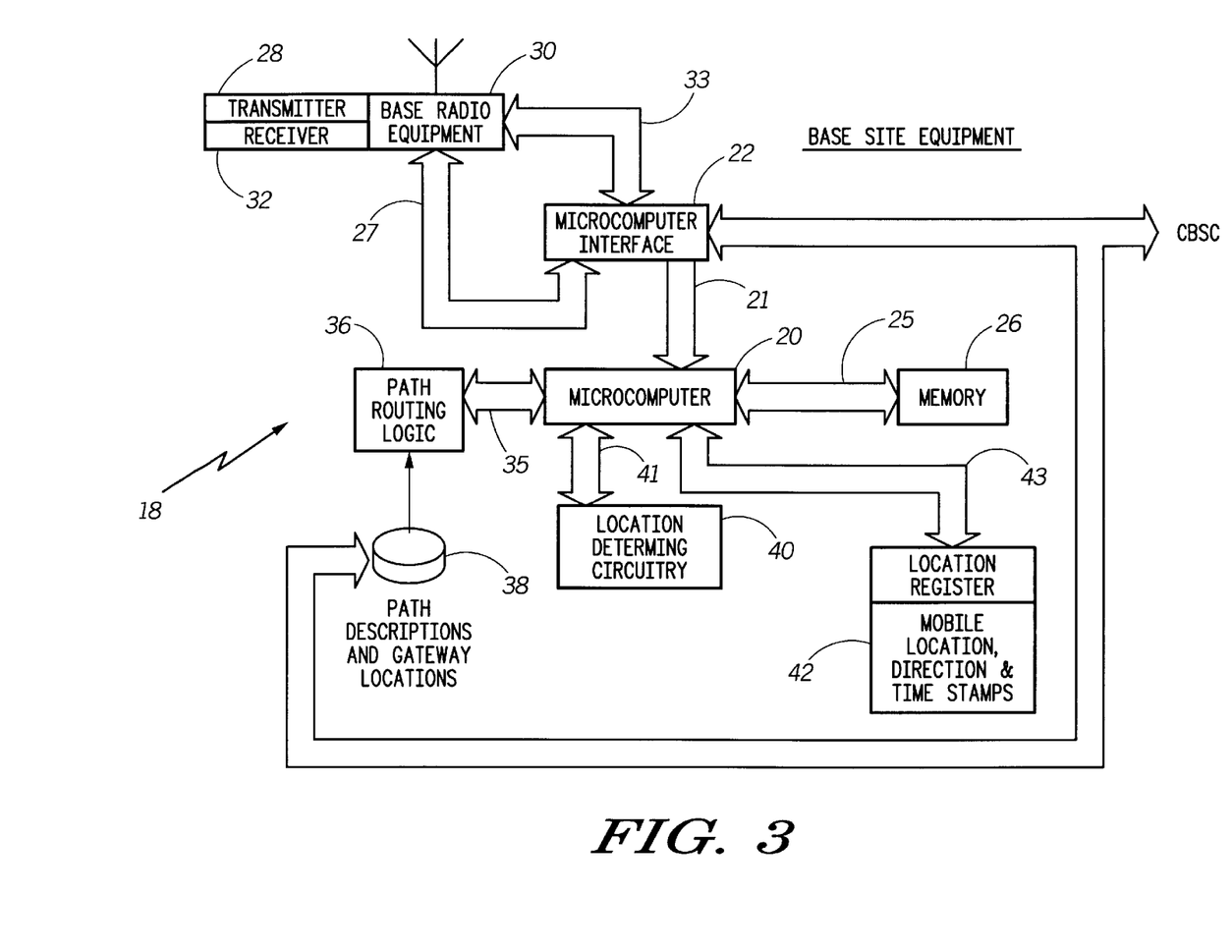
FIG. 3 is a block schematic circuit diagram of a base station at a gateway base site.

In FIG. 3 there is illustrated a schematic circuit diagram for circuitry 18 at a base station 10 located at a gateway base site. As shown, the circuitry 18 includes a microcomputer 20 which receives data via a buss 21 from a micro computer interface 22 which in turn receives messages and data packets from a switch controller 24 connected to CBSC 17.

The circuitry 18 further includes a memory 26 coupled by a buss 25 to the microcomputer 20 and the microcomputer 20 is coupled by a buss 27 to the microcomputer interface 22 and to a transmitter 28 in the base radio equipment 30. The base radio equipment 30 also includes a receiver 32 for receiving wireless data, such as voice and data packet messages, as well as location information, such as from a mobile station 14 via a satellite and may supply such data through an A/D converter to the microcomputer interface 22.

The base radio equipment 30 may also provide digital data directly to the microcomputer interface via a buss 33. Also coupled to the microcomputer 20 via a buss 35 is path routing logic 36, which in turn is coupled to a source or table 38 of path descriptions and gateway locations. As shown, the path descriptions and gateway locations table 38 is also coupled to the CBSC 17.

The path descriptions are, for example, the major roads within the territory of the gateway at the base station 10 for that particular base site.

Further, location determining circuitry 40, which receives location data from a satellite via a satellite antenna 39, is coupled by a buss 41 to the microcomputer 20. Still further, a location register 42, including mobile location, direction and time stamps is coupled via a buss 43 to the microcomputer 20 as shown. If desired, the location register 40 could be located at another location such as at a switch or at a service control point (SCP).

When a message or a data packet is received at the base station 10 for a particular designated mobile station 14A the message is transmitted by radio transmitter to the designated mobile station 14A. However, if the mobile station 14A has traveled outside the range of the base station 10, then location data that had been previously stored for the designated mobile station 14 relating to its location and to its path or direction of movement is retrieved from the memory 26 and the message is sent along the most logical path determined by the microcomputer as shown in FIG. 1.

As shown in FIG. 1, the signal is sent to three (3) stations, 14C, 14D and 14E, which are within an arc of the path on route defined between path border PA and PB. Since mobile stations 14B, 14C and 14D, are not the designated stations, mobile station 14A, they retransmit and repeat the message or data packet. Mobile units 14E and 14F are outside the gateway coverage area and, also outside the path of route 12. Hence, mobile units 14E and 14F do not retransmit the data packet. The mobile stations 14B and 14D, however, being in the path, try to retransmit the message to both mobile stations 14G and 14H which are within the path 12. Both of these stations 14A and 14G then retransmit the message or data packet since they are not the designated mobile station 14A and in this instance they both transmit to mobile stations 14 outside of the path and to mobile station 14I which is within the path. Then it is shown mobile station 14I retransmits to the designated mobile station 14A which receives and processes the message or data packet.

Figure 4:
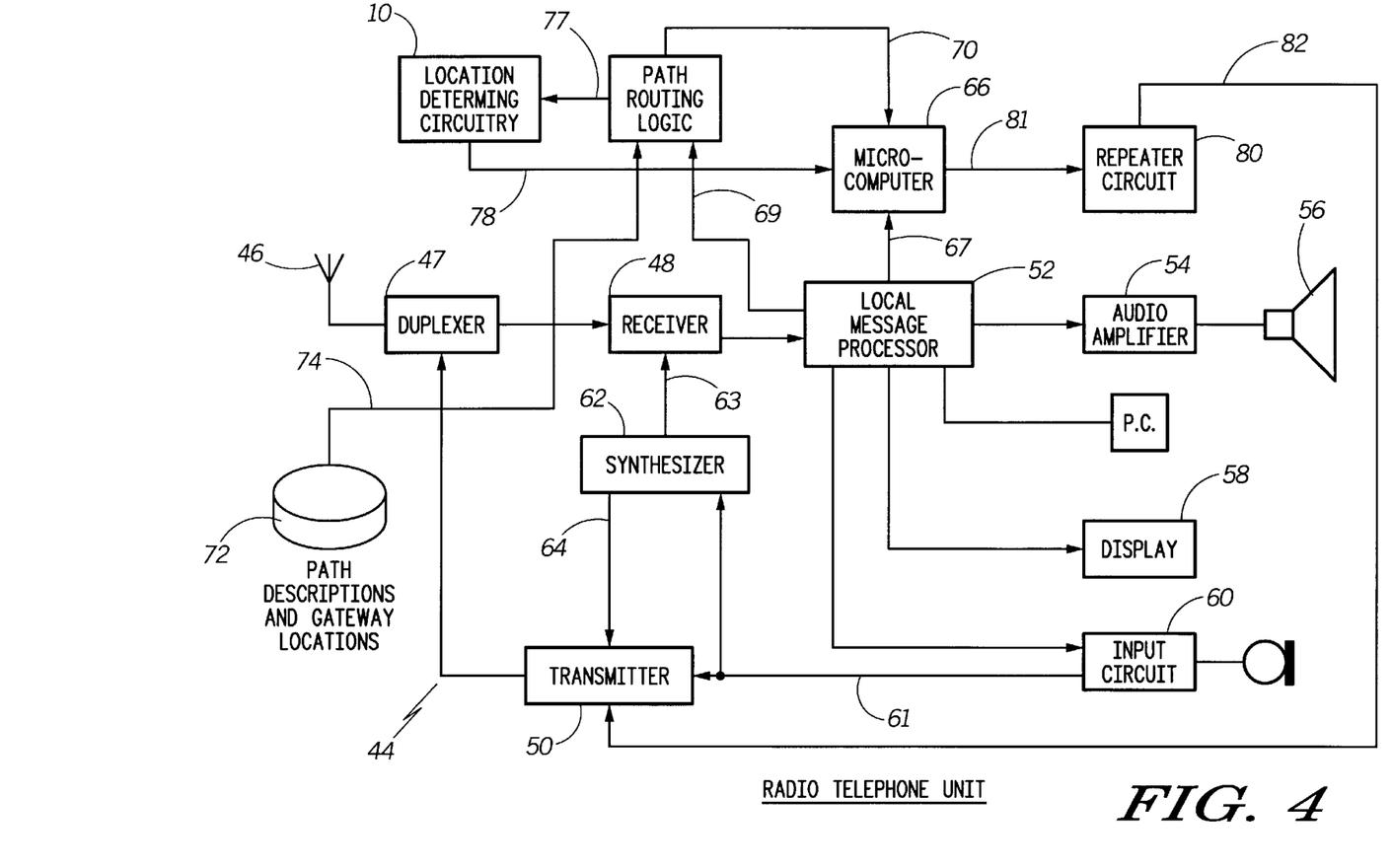
FIG. 4 is a block schematic circuit diagram of a mobile remote unit, e.g., a cellular telephone, constructed according to the teachings of the present invention.

In FIG. 4 there is illustrated a schematic circuit diagram for circuitry 44 for a mobile unit or station 14, e.g. for a cellular telephone or radio telephone unit, 14, constructed according to the teachings of the present invention. As shown, each of the mobile stations 14 has an antenna 46 coupled through a duplexer 47 to a receiver 48 and to a radio transmitter 50.

The radio telephone unit 14 further includes a local message processor 52 which receives an input signal from the receiver 48. If the message is for this particular mobile unit 14, then the local message processor 52 will supply the signal to a audio amplifier 54 coupled to a speaker 56 and/or to a display 58.

The local message processor 52 is also coupled via an RS-232 or other similar coupling to a personal computer (PC) 59 for processing e-mail, fax or video data and data storage. The personal computer (PC) 59 can also be used to create and transmit data packets to the mobile unit 14 for transmission to another telephone station via a base site.

The radio telephone unit 14 further includes an input circuit 60 coupled via a buss line 61 to the transmitter 50 and to a synthesizer 62. The synthesizer 62 is coupled by a buss line 63 to the receiver 48 and a buss line 64 to the transmitter 50.

The local message processor 52 is also coupled to a microcomputer 66 via a line 67 and to path routing logic 68 via a line 69.

The path routing logic 68 is also coupled by a line 70 to the microcomputer 66. Then, a source or table 72 of path descriptions and gateway locations is coupled via a line 74 to the path routing logic 68. Further, location determining circuitry 76, which receives location data from a satellite via a satellite antenna 75, is coupled to the path routing logic 68 via a line 77 and to the microcomputer 66 via a line 78. The receiver 48 inputs data to the path routing logic 68 via a line 79.

The microcomputer 66 is further coupled to a repeater circuit 80 via a line 81 and the repeater circuit has an output 82 coupled to the transmitter 50.

The path routing logic 68 receives location information contained in the received message or data packet from the receiver 48 and the current location of the mobile unit 14A from the location determining circuitry 76. The path routing logic 68 determines whether the data packet should be repeated by the mobile unit 14 or sent to the local processor 52 for consumption. Information regarding location is then also supplied to the microcomputer 66 via line 78. The microcomputer 66 then causes the repeater circuit 80 to send the signal back to the transmitter 50 via the output line 82. The signal contains path routing information and path direction information and is transmitted by the antenna 46 to another mobile station or unit 14.

Since the method and system of the present invention is radio transmission of data packets, one can assume that each mobile station 14 can be in two logical states with respect to the closest gateway base station 10; either registered or not.

In one preferred embodiment of the method of the present invention the following steps take place:

1. The mobile station 14 enters the traffic path or route 12 and registers to the closest gateway base station 10. As part of the registration process, its home location register becomes aware of its whereabouts. The gateway base station 10 registers the mobile unit 14 in the current segment of the traffic route database together with its characteristics. Then it downloads to the mobile unit or station 14 the geographic information about the current segment of the traffic route 12.

2. Being registered to the gateway base station 10 and being within the area of coverage, the mobile station 14 receives data packets that are sent to the gateway base station 10 and forwarded over the air to the mobile station 14. Each packet is time stamped and tagged with the last known coordinates of the designated destination mobile station 14A, and an indication of direction of movement of the designated mobile station 14A. If the data packets are destined for the mobile station 14 receiving them, they will be processed by that mobile station 14 (e.g. FAX, e-mail); as the packets are received, they are acknowledged, individually or as a group, and they are time stamped and tagged with the coordinates of the location of the mobile station 14A. As this information eventually makes its way to the gateway base station 10, it allows it to update the location information of the mobile station 14A and to set the timers and allocate buffers and other resources according to the new distance.

If the packets are not intended for the current mobile station, they would be repeated or dropped, as described in the procedure at step 4 below.

3. As it moves along the traffic route 12, the mobile station 14A will eventually reach a point where it gets out of the gateway's coverage area. The event is detected by both the gateway base station 10 and the designated mobile station 14A (e.g. via a high number of unacknowledged packets or failure to hear some beacon). Of course, if the mobile station 14A enters the coverage area of another base station 10, it will be handed over and the process resumes as in step 1. However, in general, that might not be the case.

4. Nevertheless, the mobile station 14A will still receive packets from the other mobile stations 14 that repeat them as mentioned at step 2. If such a packet is destined for the mobile station 14A, it will be processed by the application and acknowledged. The acknowledgment packets are tagged with the geographic coordinates of the gateway base station 10, and will be routed as described below. If the data packets are not destined for the current mobile station 14, they will be discarded or repeated according to the following procedure:

(a) if the data packet has been received before within a given period of time, it will be discarded. This prevents an undue avalanche of repeated packets. Only a small FIFO is required to keep trace of the received packets;

(b) if the packet is tagged with the coordinates of a destination that is beyond the position of the current mobile station 14, but in the direction of its movement, the packet will be repeated;

(c) if the packet is tagged with the coordinates of a destination that is behind the position of the current mobile station 14, it will be dropped or repeated depending on whether the speed of the traffic can justify the change in position. The time stamps on packets are used to determine the reasonable change in position;

(d) if a mobile station 14 receives a repeated data packet having a last location which is not as close to the designated mobile unit 14A as is the transmitting mobile station 14, then the receiving mobile station 14 will drop the packet; and, (e) prior to each repeat, each unit will wait a random period of time to minimize collisions; if a collision is detected, the mobile station 14 will back off for a random period of time and, if still appropriate, it will retransmit.

5. As the mobile station 14A enters the coverage area of a new gateway base station 10, it will register with it. The old gateway base station 10 is notified, and prior to de-registering the mobile station 14A, it will forward all unacknowledged data packets to the new gateway base station 10. Also, the change will be entered in the home location register. The mobile station might continue on the traffic route (in which case, we are back to step 1), or might leave it, and the delivery of the data will proceed otherwise.

Of course, the mobile station 14A might initiate the transfer. In that case, the data packets would be destined to the closest gateway base station 10.

Essentially, the method of the present invention changes the mobile stations 14 into low power intelligent repeating relays, so that as they move they can geographically route information along a traffic route incompletely covered by the transmitter of a gateway base station 10.

The protocol for sending a message from a base station 10 is as follows:

1. A data packet is received for a mobile unit destination address.

2. The software at the base station 10 looks up the destination address at the location register and determines if the designated/destination mobile unit 14 is in a traffic route 12. If so, the software selects a route identification and a proximate location of the mobile unit 14 using the direction of the mobile unit and constructs a mobile unit route packet followed by broadcasting the data packet.

However, if the mobile unit is in the local servicing area of the gateway base site, then a local broadcast of the packet is made, otherwise the packet is dropped.

Figure 5:
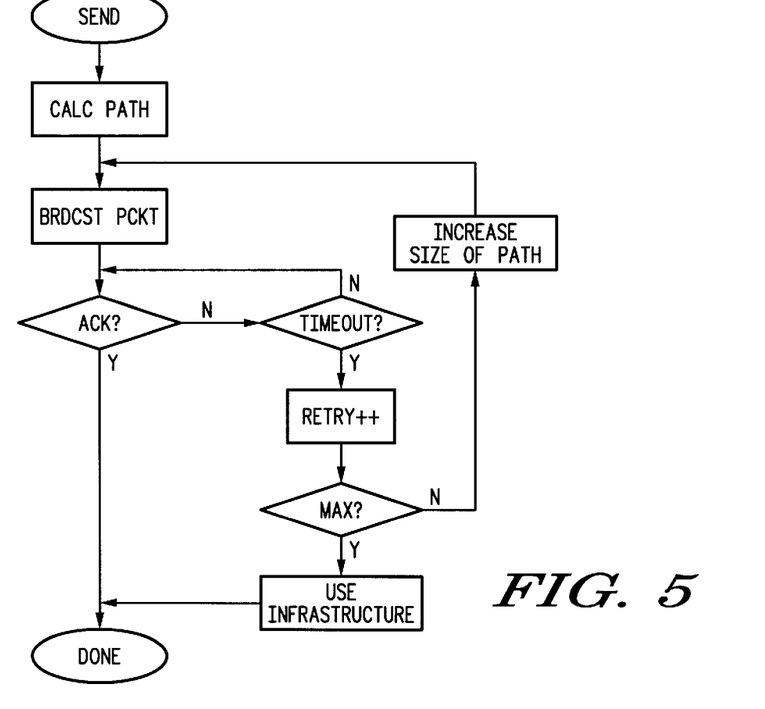
FIG. 5 is a flow chart of the steps followed by a mobile unit upon receiving a data packet message along a traffic path.

Referring now to FIG. 5 the protocol for receiving data by a mobile station 14 is generally illustrated in FIG. 5.

The steps or protocol for processing the received data packet is as follows:

When the data packet is received, a check is made to determine the destination address of the packet and a determination is made if the packet is for the receiving mobile unit 14. If yes, then the data packet is processed and an acknowledgment of receipt is sent.

If not, a determination is made of the location of the mobile unit receiving the data packet. Next, a determination is made if the receiving unit 14 is within the boundary of a designated path in the data packet. If no, then the packet is discarded.

If the receiving unit 14 is closer to the destination location then the location of the last repeating unit using location of itself and comparing with destination location and last location of fields of the data packet, then the receiving unit 14 will retransmit or repeat the data packet.

In determining the boundary of the designated path the software uses a tolerance field contained in the packet to determine path boundary.

Figure 6:
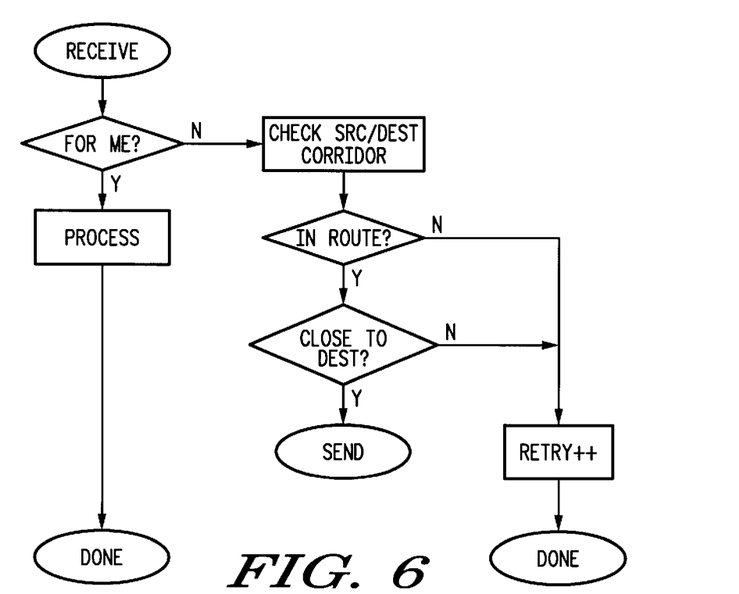
FIG. 6 is a flow chart of the repeating or sending of a data packet message by an intermediate mobile remote unit which is not a designated/destination mobile unit.

The protocol for a repeater send procedure is illustrated in FIG. 6 and includes the following steps for repeater transmitting:

Retrieve path description from the data packet.

Determine location of cellular mobile unit 14A.

Replace the last location field of the data packet with the current location of the current mobile unit 14.

Broadcast the data packet.

If the rebroadcast of the data packet is not heard and no acknowledgment is heard then increase the tolerance for the path boundary and retry.

If maximum number of retries, such as for example, five (5) retries, is exceeded, then store the data packet for delivering at the next gateway base site.

The retry algorithm includes random retry time-outs between retransmissions.

Figure 7:
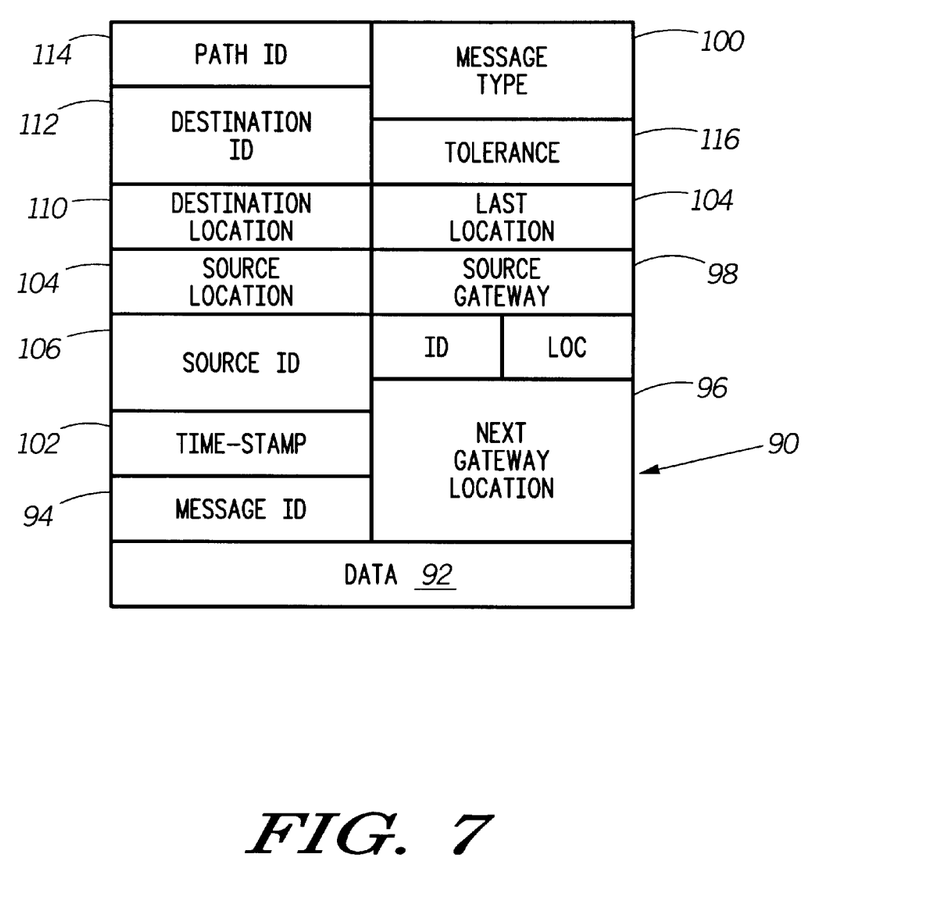
FIG. 7 is a layout of a data packet.

The layout of a data packet 90 is shown in FIG. 7 and includes: a data section 92, a message ID section 94, the next gateway location section 96, a source gateway section 98 including gateway ID and gateway location, a message type section 100, a timestamp section 102, a direction of mobile section 103, a source location section 104, a source ID section 106, a last location section 108, a destination location section 110, a destination ID section 112, a path ID section 114 and a tolerance section 116.

From the foregoing description it will be apparent that the method and apparatus or system for connectionless data packet routing along traffic paths described above have a number of advantages some of which have been described above and others of which are inherent in the invention. Also, modifications can be made to the method apparatus of the present invention without departing from the teachings of the invention. Accordingly, the scope of the invention is only to be limited as necessitated by the accompanying claims.

We claim:

1. A base site for transmitting data packets in a cellular communication system including:

a microcomputer;

a receiver coupled to the microcomputer for receiving mobile unit position data from a global positing satellite;

a transmitter and a second receiver coupled to the microcomputer for communicating with mobile units within the coverage area of the base site;

protocol associated with the microcomputer for establishing a traffic route and a general direction of movement of a particular mobile unit;

the second receiver receiving data packets;

and circuitry for causing the transmitter to transmit data packets addressed to the particular mobile unit to mobile units along the traffic route of the particular mobile unit.

2. The base site of claim 1 comprising location determined circuitry coupled to said microcomputer; path routing logic coupled to said microcomputer, and a mobile unit location register coupled to said microcomputer.

3. The base site of claim 2 including a path description and gateway location table coupled to said path routing logic.

4. A mobile unit for receiving and retransmitting data packets, said mobile unit comprising a microcomputer, circuitry coupled to said microcomputer for identifying from data packet the address of a designated mobile unit, circuitry coupled to said microcomputer for determining from the data packet the last known location of the designated mobile unit and circuitry for determining the most logical path or route of the designated mobile unit whereby said microcomputer can retransmit the data packet in a direction along the most logical path or route of the designated mobile unit.

5. The mobile unit of claim 4 including path routing logic coupled to said microcomputer.

6. The mobile unit of claim 5 including a path description and gateway location table having path descriptions and gateway locations coupled to said path routing logic.

7. The mobile unit of claim 4 comprising location determining circuitry coupled to said microcomputer.

8. The mobile unit of claim 4 including a repeater circuit coupled between said microcomputer and a transmitter for causing said transmitter to retransmit a data packet.

9. The mobile unit of claim 4 combined with a coupled to a personal computer for displaying, processing or storing received data packets, e-mail, fax, video data or other data and/or for creating and transmitting such data packets to the mobile unit for transmission to another telephone station.

* * * * *